Figure 1:
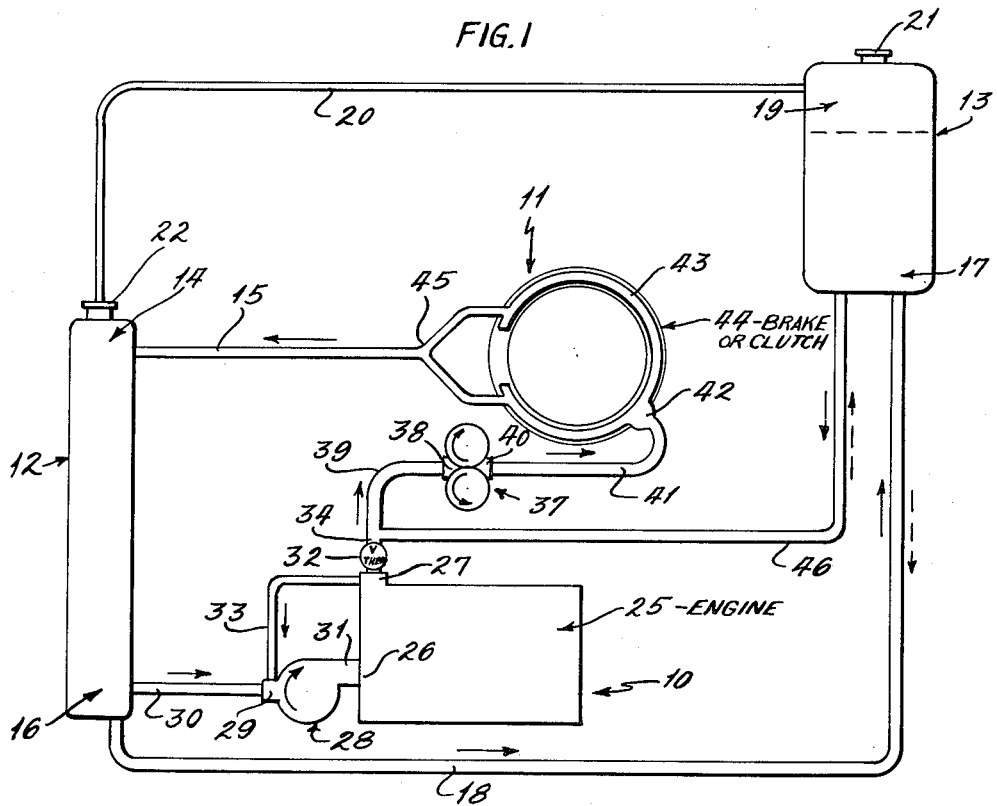

June 22, 1965  E. J. FALK  3,190,272

COOLING SYSTEM

Filed April 26, 1963

INVENTOR
EDWARD J. FALK
By Gravely, Lieder & Woodruff
ATTORNEYS

United States Patent Office 3,190,272  
Patented June 22, 1965

3,190,272  
COOLING SYSTEM  
Edward J. Falk, St. Louis, Mo., assignor to Wagner Electric Corporation, St. Louis, Mo., a corporation of Delaware  
Filed Apr. 26, 1963, Ser. No. 276,052  
10 Claims. (Cl. 123—41.09)

This invention relates generally to cooling systems and, more particularly, to a vehicle cooling system including both friction device and engine cooling branches.

In the past, separate and independent cooling systems have been provided for the engine and friction devices, such as brake or clutch mechanisms. In cooling systems for forced circulation of coolant to the several brake devices of a vehicle and through a heat exchanger for effective dissipation of heat of friction resulting from brake applications, resistance of the conduits to coolant flow has a tendency to reduce the capacity and efficiency of pumping means and produce cavitation therein. Another problem prevalent in the past has been the large volume of coolant required for operating separate systems, as well as the requirement for a large volume heat exchanger. Still another problem has been the tendency to lose coolant due to vaporization within the engine or friction devices when operating under heavy load conditions thereby increasing the volume of coolant and causing overflow.

The principal object of the present invention is to provide a novel cooling system in which the engine cooling system and friction device cooling system are interconnected in a manner to minimize the foregoing problems.

Another object is to provide a vehicle cooling system in which the brake cooling branch is adapted to operate independently of the engine cooling branch to maintain the integrity of the brake devices at all times.

Another object is to obviate cavitation in the brake system pumping means and provide more efficient operation thereof by supercharging such pumping means with fluid from the engine cooling system.

Still another object of the invention is to provide an integrated cooling system for a vehicle engine and friction devices using the same coolant thereby requiring a smaller total volume of coolant and a smaller total volumetric flow rate than in separate and independent cooling systems of a vehicle.

A further object is to provide a two branch cooling system for a vehicle in which each branch can operate independently in the event of failure of the other branch.

Another object is to provide a vehicle cooling system having means for accommodating volumetric variations of the coolant.

A still further object of this invention is to provide a cooling system having serially connected engine cooling means, friction device cooling means and reservoir means and in which separate pumping means augment each other.

These and other objects and advantages will become apparent hereinafter.

The present invention comprises a cooling system including engine and friction device cooling systems, reservoir means having an outlet and an inlet with the engine and friction device cooling systems connected therebetween, pumping means between the engine and friction device systems and having an inlet also connected to the outlet of the reservoir means.

Figure 2:
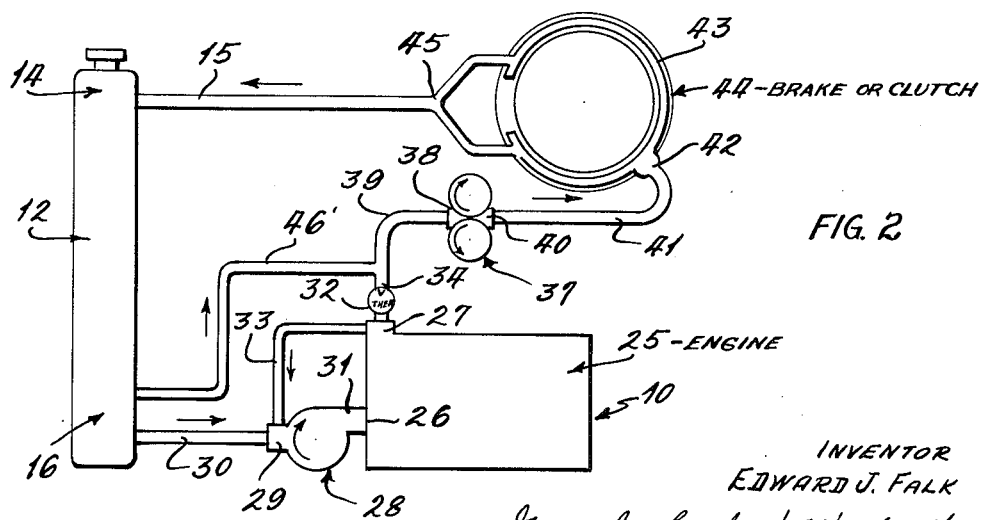

The invention also consists in the parts and in the combinations and arrangements of parts hereinafter described and claimed, with reference to the accompanying drawings in which like numerals refer to like parts:

FIGURE 1 is a diagrammatic view illustrating a preferred cooling system embodying the present invention, and FIGURE 2 is a diagrammatic view illustrating a modified cooling system.

Referring now to FIGURE 1 in detail, the cooling system includes an engine cooling branch or system 10 and a friction device cooling branch or system 11, together with reservoir means including a heat exchanger 12 and an auxiliary or reserve surge tank 13.

The reservoir means has a warm fluid inlet side (also referred to as the "hot side") which is shown as the upper portion 14 of the heat exchanger 12 and which receives heated or hot coolant from both branches 10 and 11 of the cooling system through a return conduit 15. The coolant passes through the heat exchanger, which may be an air cooled tube and fin radiator or the like, and heat is thus dissipated from the coolant. The reservoir means also has a cool fluid outlet side (also referred to as the "cold side") including the lower portion 16 of the heat exchanger 12 and the lower portion 17 of the surge tank 13, which are connected by a conduit 18.

It will be noted that the surge tank 13 is mounted above the level of the heat exchanger 12 and provides a supply of cooled fluid in its lower portion 17 for immediate use by the friction device cooling branch 11. The surge tank 13 also provides an upper expansion chamber 19 which is connected by a vent line 20 to the top of the heat exchanger 12 and thus provides a passage for air to escape from the heat exchanger 12 to the surge tank 13 and accommodates variations in the volume of coolant in the cooling system. The surge tank 13 has a filler cap 21 through which the system may be replenished with cooling fluid from time to time and, although the system may be vented to atmosphere through the cap 21, it is preferred to provide a pressurized system. Therefore, although the heat exchanger 12 is shown with a filler cap 22, it is preferably a pressure cap to maintain a fluid tight seal.

The engine cooling branch 10 includes an engine 25 having an inlet 26 and an outlet 27 with the usual fluid passages through a cooling jacket therebetween for circulation of cooling fluid through the engine. An engine coolant pump 28 has a suction side 29 connected by a conduit 30 to the cold side 16 of the reservoir means 12 and a pressure side 31 connected to the engine inlet 26. The engine outlet 27 is provided with a thermostat 32 to control the circulation of the cooling fluid from the engine outlet into conduits 33 or 34. The conduit 33 is a by-pass or fluid recirculation means between the engine outlet 27 and the suction side 29 of the engine pump 28 through which coolant is recirculated in a short circuit to the engine 25 when the engine is below a predetermined temperature (normally about 180° F.) and the thermostat 32 remain closed. The thermostat 32 opens when the temperature of the coolant at the engine outlet 27 reaches the predetermined temperature and normally remains open during continued engine operation to discharge the coolant into conduit 34 connecting the engine cooling branch 10 with the friction device cooling branch 11.

The friction device cooling system 11 includes a fluid impelling or pumping means 37, preferably a positive displacement pump, having a suction side 38 connected by a conduit 39 to the conduit 34 from the engine outlet 27. The pump 37 has a pressure side 40 connected by a conduit 41 to the inlet 42 of a cooling fluid passage 43 of a friction device 44 (or a plurality of such devices). The friction device 44 may be a fluid cooled disc brake of the type more fully disclosed in Gold et al. Patent No. 3,044,582 for Brake System. The cooling fluid passage 43 also has an outlet 45 connected by the conduit 15 with the hot side 14 of the reservoir means 12. The friction device cooling system 11 also includes a fluid supply conduit 46 connected between the cold side 17 of the reservoir means 13 and the conduits 34, 39 to the suction side 38 of the pump 37.

Both the engine pump 28 and the pumping means 37 may be driven by the engine 25 and independent drive means (not shown) may be provided therefor as a safety factor in case of fan belt failure. The engine pump 28 is adapted to circulate a small volume of coolant at a high rate of flow to remove engine heat, and it will be apparent that the coolant discharged from the engine 25 through the thermostat 32 and conduit 34 will be heated at least to the predetermined temperature required to open the thermostat 32 and therefore will be relatively hot. However, the pumping means 37 is adapted to circulate a relatively large volume of coolant at a high rate of flow and, consequently, will draw a large volume of coolant from the cold side of the reservoir means through the conduit 46 relative to the small volume of hot fluid delivered into the suction conduit 39 from the engine 25. Accordingly, the total volume of fluid circulated through the pumping means 37 to the friction device system 11 has a temperature that is not appreciably higher than the coolant temperature at the cold side of the reservoir means.

In the operation of the cooling system, when the engine 25 is cold, the engine coolant pump 28 draws fluid from the cold side 16 of the heat exchanger 12 through the conduit 30 and circulates it through the engine inlet 26 and the engine cooling jacket to the engine outlet 27. The engine thermostat 32 is normally closed and causes the fluid to be circulated through the by-pass conduit 33 back to the suction side 29 of the pump 28 and recirculated through the engine cooling system 10 until the engine 25 reaches its operating temperature. When this predetermined temperature is reached, the thermostat 32 opens and allows hot fluid from the engine cooling system 10 to pass from the engine outlet 27 through the conduits 34 and 39 to the brake coolant pump 37.

The brake coolant pump 37 also draws a relatively larger volume of cooling fluid from the surge tank 13 through conduits 46 and 39 than is received from the engine 25 so that the resulting temperature of the coolant discharged by the pump 37 into the branch 11 is low enough to rapidly dissipate the large amount of heat that may be generated by frictional braking applications. The coolant is then discharged from the system 11 through the conduit 15 to the heat exchanger 12 to be cooled, and will flow through the conduit 18 to the surge tank 13.

During normal operation when both the engine coolant pump 28 and the brake coolant pump 37 are functioning with the engine thermostat control valve 32 open, the pumps augment each other. The engine pump 28 draws its volumetric fluid requirement from the heat exchanger reservoir 12, and the brake pump 37 easily accommodates this volume of fluid discharged thereto from the engine 25 and makes up its total volumetric fluid requirement from the surge tank reservoir 13. Accordingly, neither pump can starve the other, and the two pumping units function together to enable the system to operate continuously on a solid stream of coolant, the pump 28 charging the pump 37 and preventing cavitation and flashing. Furthermore, the pump arrangement maintains a more uniform pressurized flow of fluid through the branches 10 and 11 and the reservoir means 12 and 13 to provide a more uniform engine temperature. Normal fluid flow is indicated by the solid arrows in FIGURE 1.

In the event a braking application is required before the engine 25 reaches its normal operating temperature to open the thermostat 32, it is apparent that the pump 37 will draw its entire volumetric requirement from the surge tank 13 through the conduits 46 and 39 and this coolant will be circulated through the friction device cooling system 11 to the heat exchanger 12 and through conduit 18 to the surge tank 13.

If for some reason the brake coolant pump 37 is not functioning, the engine coolant pump 28 is provided a free fluid circulating path through conduits 34 and 46 to the surge tank 13 from which coolant flows through the conduit 18 back to the heat exchanger 12 as indicated by the broken arrows. The volume of reserve fluid in the surge tank 13 assures a cooled fluid supply to the engine pump 28.

Referring now to FIGURE 2 in which a modified system embodying the present invention is shown, it will be seen that the surge tank 13 together with the conduits 18 and 46 are eliminated and a conduit 46' is connected between the cold side 16 of the reservoir means 12 and the suction side 38 of the pumping means 37. However, the conduit 46' is connected above the conduit 30 a predetermined distance to provide for cooled fluid discharge to the engine pump 28 in the event of failure of the pump 37. This modification can be used only if the heat exchanger 12 is sufficiently large to accommodate the large volume of fluid necessary to adequately cool the friction device 44 or if a header (not shown) is provided at the upper portion 14 of the heat exchanger 12. When the engine 25 is below its operating temperature, a free path for cooling fluid from the reservoir means 12 to the brake cooling system 11 is provided through conduits 46' and 39 to the pump 37 which forces fluid through the friction device 44 and return conduit 15 back to the reservoir means 12.

If both pumps are functioning normally and the engine 15 has reached its operating temperature to open the thermostat 32, a small volume of fluid from the reservoir means 12 is forced by the engine pump 28 through the engine 25 to the conduit 34 where it is joined by a larger volume of cooled fluid drawn from the heat exchanger 12 through the conduit 46'. This fluid is then circulated in the system 11 and reservoir heat exchanger as previously described.

In the event the brake coolant pump 37 is not functioning, coolant flows from the heat exchanger 12 through the conduit 30 to the engine pump 28 and is forced through the engine 25 and returned to the heat exchanger 12 through the conduits 34 and 46.

Thus, it is apparent that a novel vehicle cooling system has been provided wherein brake cooling and engine cooling branches are interrelated to provide improvements meeting the objects and advantages hereinbefore set out.

This invention is intended to cover all changes and modifications in the disclosure that will be apparent to one skilled in the art, and the invention is limited only by the scope of the claims which follow.

What I claim is:

1. A cooling system including a fluid cooled friction brake or clutch device system and an engine cooling system, reservoir means for cooling and storing fluid and having a warm fluid inlet side connected to said friction device system and a cool fluid outlet side, pumping means connected between the outlet side of said reservoir means and said friction device system for continuously circulating cooling fluid therethrough for return to said reservoir means, and other means for circulating cooling fluid from the outlet side of said reservoir means through said engine cooling system and discharging it to said pumping means.

2. The cooling system according to claim 1 in which said reservoir means comprises a heat exchanger and said pumping means and other means having separate connections to the outlet side of said heat exchanger.

3. The cooling system according to claim 1 in which said reservoir means comprises a heat exchanger and a surge tank, the surge tank being connected to and forming a portion of outlet side of said heat exchanger for auxiliary storage of cooling fluid.

4. The cooling system according to claim 3 wherein said pumping means has a suction side connected to said surge tank, and said other means is connected directly to said heat exchanger.

5. A vehicle cooling system comprising a friction brake or clutch device cooling branch and an engine cooling branch, reservoir means for receiving and cooling fluid from both branches and providing a supply of cooled fluid to both branches, said engine cooling branch having pumping means producing a relatively small volumetric fluid flow therein, and said friction device cooling branch having pumping means receiving said fluid flow from said engine cooling branch and also drawing a relatively larger volumetric fluid flow of cooled fluid from said reservoir means for circulation of the total volume of fluid through said friction device cooling branch and return to said reservoir means.

6. A cooling system comprising a friction brake or clutch device cooling branch and an engine cooling branch, reservoir means including a heat exchanger having a warm fluid inlet side, a reserve reservoir connected to the outlet of said heat exchanger and together therewith forming a cold fluid side of said reservoir means, means serially connecting said engine cooling branch and friction device cooling branch between said outlet of said heat exchanger and the inlet side thereof for circulation of a relatively low volume of fluid at a high flow rate through said engine cooling branch, and other means between said branches and connected to said reserve reservoir for circulation of a relatively high volume of fluid at a high flow rate through said friction device cooling branch.

7. The cooling system according to claim 6 in which said other means is adapted to circulate cooling fluid through said friction device cooling branch independently of said engine cooling branch.

8. The cooling system according to claim 6 in which said reserve reservoir comprises a surge tank disposed horizontally above said heat exchanger, the heat exchanger outlet being at the bottom thereof and being connected to the lower portion of said surge tank, and the upper portions of said surge tank and heat exchanger being connected by a vent line to maintain said heat exchanger full of cooling fluid and bleed air from said cooling system to said surge tank.

9. A vehicle cooling system comprising a friction brake or clutch device cooling branch and an engine cooling branch, a heat exchanger and a surge tank forming reservoir means for coolant, first pumping means including a suction side and a pressure side for circuating coolant from said heat exchanger through said engine cooling branch, second pumping means including a suction side and a pressure side for circulating said fluid from said engine cooling branch and from said surge tank through said friction device cooling system and to said heat exchanger.

10. The cooling system according to claim 9 wherein said engine cooling system includes thermostatic means for controlling the discharge of cooling fluid therefrom, and a by-pass conduit connected across said engine cooling system and with the suction side of said engine pumping means for recirculation of fluid through said engine cooling system when said engine is below a predetermined operating temperature.

References Cited by the Examiner
UNITED STATES PATENTS

| | | | |
|---|---|---|---|
| 2,541,227 | 2/51 | Findley | 123—142.5 |
| 2,748,900 | 6/56 | Booth | 123—142.5 |
| 2,930,456 | 3/60 | Sanford | 188—264.25 |
| 3,024,876 | 3/62 | Montgomery | 188—264.2 |
| 3,047,104 | 7/62 | Schjolin | 188—264.2 |
| 3,080,857 | 3/63 | Middendorf | 123—41.1 |

RICHARD B. WILKINSON, *Primary Examiner.*
KARL J. ALBRECHT, *Examiner.*